2,708,663

COPOLYMERS OF N-METHYL MALEIMIDE

John Downing and James Gordon Napier Drewitt, Spondon, near Derby, England, assignors to British Celanese Limited, a corporation of Great Britain No Drawing. Application June 2, 1952,
Serial No. 291,308

Claims priority, application Great Britain June 4, 1951

2 Claims. (Cl. 260—78)

This invention relates to copolymers and especially to a new series of vinyl copolymers and to products made therefrom.

There has long been a demand for linear polymers that can withstand high temperatures without melting or decomposition and are resistant to water and to most organic liquids but can, for the purpose of fabrication, be dissolved in at least one of the readily available volatile organic liquids. This combination of properties is rare. Most of the linear polymers which have the desired stability to heat are insoluble in all the common volatile organic liquids.

In the course of an extensive search for polymers having the desired properties, we have investigated the possibility of copolymerising N-methyl and N-phenyl maleimides with various vinyl or substituted vinyl monomers. We found it impossible to predict the properties of the copolymers obtained from a particular pair of monomers or indeed even to predict whether the two monomers would copolymerise at all. With N-phenyl maleimide for instance, we readily obtained, with styrene in benzene solution, using benzoyl peroxide as catalyst, a copolymer of softening point about 200° C., but with the maleimide and vinyl acetate or acrylonitrile under the same conditions no copolymerisation could be obtained. (The "softening points" referred to in this specification are the temperatures to which a copper bar must be heated before the powdered polymer dusted on to the bar sticks thereto.) The difficulty of predicting softening or melting points of the copolymers from those of homopolymers of the comonomer may be illustrated with respect to the copolymerisation of N-methyl maleimide with styrene and vinylidene chloride respectively. Although polyvinylidene chloride does not melt below 210° C. while the best quality polystyrene melts least 30° lower, the softening points of copolymers of vinylidene chloride with the maleimide were found to be lower than those of the copolymers of the maleimide with styrene. Thus, for example, copolymerisation in benzene solution, using benzoyl peroxide as catalyst, and with equimolecular proportions of the two monomers, gave a copolymer with vinylidene chloride of softening point 175° C. and a copolymer with styrene of softening point 180° C.

We have found that N-methyl maleimide can be copolymerised with acrylonitrile to yield a particularly valuable series of copolymers capable of withstanding relatively high temperatures without melting or decomposition, insoluble in water, acetone, ethyl acetate and chlorinated aliphatic hydrocarbons, but soluble in nitromethane and in pyridine (as well as in certain less volatile and more expensive solvents such as dimethyl formamide and sulpholane).

The following example illustrates the invention:

Example

A stainless steel autoclave was charged with a reaction mixture of the following composition, all the parts being by weight:

97 parts of N-methyl maleimide
53 parts of acrylonitrile
800 parts of benzene
1 part of benzoyl peroxide The charge was kept at a temperature of 60° C., and agitated, for 70 hours. On opening the autoclave the polymer was found to have precipitated. It was filtered off, washed with benzene and dried. The polymer had a softening point of 205° C. It was soluble in nitromethane, pyridine, sulpholane and dimethylformamide and insoluble in acetone, ethylene dichloride and 1-nitropropane. The conversion was 72% and the two monomers were present in the polymer in substantially equal molar proportions.

Over a range of molar proportions of the maleimide to acrylonitrile from 20:80 to 80:20 we have obtained copolymers having the solubility properties as specified above and also capable of withstanding relatively high temperatures without melting or decomposition. The fact that melting or incipient melting occurs in the polymers of the invention below the temperature of decomposition is an added advantage of these polymers compared with, say, polyacrylonitrile in that they can be moulded and extruded in the absence of solvent. Their solubility in pyridine and especially in nitromethane is particularly valuable in facilitating dry-spinning and other methods of fabricating the polymers, for example their formation into the films by the evaporative method.

As indicated above the copolymerisation can be effected in solution. Preferably the solvent employed is a non-solvent for the polymer and for this purpose benzene is suitable, due precautions being of course taken on account of its toxicity. Polymerisation can also be carried out in a solvent for the polymer, but this method is likely to lead to products of lower average molecular weight. Another method that may be adopted is to carry out polymerisation is an aqueous suspension or emulsion. The monomers may, for example be dispersed in water with the aid of suitable dispersing agents, for example, sodium secondary octadecyl sulphate or the alkali metal salts or ammonium salts of other long-chain alkyl sulphates, or aralkyl sulphates, of alkyl-aryl sulphonic acids, or of long-chain alkyl carboxylic acids. Cationic and non-ionic dispersing agents can also be used. Instead of carrying out the polymerisation in emulsion the monomers can be kept suspended in an aqueous medium containing the catalyst, a protective colloid but no emulsifying agent being present.

As polymerisation catalyst, benzoyl peroxide has already been mentioned. This catalyst is suitable for use also when the polymerisation is carried out in an aqueous medium but we prefer for that purpose to use a water-soluble persulphate especially potassium persulphate. Other peroxy compounds such as are known as catalysts for emulsion polymerisation can also be used. Such substances include acetyl peroxide, para-tertiary butyl hydroperoxide, lauryl peroxide and hydrogen peroxide. With a view to accelerating the polymerisation a redox catalyst system can be used. Thus, for example, sodium sulphite, potassium meta-bisulphite, sodium sulphinate or other suitable reducing agents may be employed in conjunction with any of the peroxy catalysts referred to above to form a redox system. Alternatively in a redox system, for example one using any of the reducing agents specified above, free oxygen may be used instead of a peroxy compound. Preferably, however, a peroxy compound is used with or without a reducing agent in the absence of atmospheric oxygen, for example under an atmosphere of nitrogen. Redox systems in which a sugar acts as a reducing component can also be used. Catalyst activators other than reducing agents may be present. Such activators include, for instance, complex salts of metals or the iron group, for example, potassium ferricyanide, and simple salts of metals which are oxidation catalysts, for example silver and copper. Polymerisation regulators, for example dodecyl mercaptan, acetaldehyde or dioxane may be used to control the average molecular weight of the copolymer. We prefer to carry out the polymerisation at temperatures not substantially above 75° C., for example at 40 to 60° C.

From the copolymers of the invention fibres may be obtained, for example by wet-spinning or dry-spinning. The copolymer in solution in pyridine or nitro-methane may, for example, be wet-spun into a bath comprising a liquid which is a solvent for the particular volatile solvent used but not for the copolymer. Or the copolymers of the invention may be dry-spun for instance from solution in nitro-methane. The filaments formed may be stretched under such conditions as to enhance their tenacity and may subsequently be stabilised against shrinking when heated up to a particular temperature, by a heat treatment carried out at a higher temperature.

Films can be formed from the copolymers of the invention by casting solutions of the copolymers, for example in nitromethane, on to an endless film-casting band or a film-casting wheel and evaporating the nitromethane during the travel of the band. Or films can be made by wet casting methods from solutions of the copolymers. The copolymers can be shaped by moulding methods and by hot solventless extrusion.

Various after-treatments may be applied to the products of the invention so as still further to increase their heat resistance. Thus, for example products fabricated from the polymers of the invention may be treated so as to hydrolyse some of the nitrile groups. They may be heated to a temperature at which some slight decomposition occurs accompanied by some cross-linkage of the chains, or they may be treated with appropriate cross-linking agents.

Having described our invention what we desire to secure by Letters Patent is:

1. Process for the preparation of an acetone-insoluble nitromethane-soluble copolymer of N-methyl maleimide and acrylonitrile alone, which comprises forming a reaction mixture consisting substantially of 97 parts by weight of N-methyl maleimide, 53 parts by weight of acrylonitrile, 800 parts by weight of benzene and 1 part by weight of benzoyl peroxide, subjecting the said reaction mixture to a temperature of 60° C. with agitation for 70 hours, washing the polymer produced with benzene and drying the same.

2. A copolymer of N-methyl maleimide and acrylonitrile, made in accordance with the process of claim 1, having a softening point of 205° C., soluble in a solvent of the group consisting of nitromethane, pyridine, sulpholane and dimethylformamide, and insoluble in a member of the group consisting of acetone, ethylene dichloride and 1-nitro-propane.

References Cited in the file of this patent

UNITED STATES PATENTS

| | | |
|---|---|---|
| 2,384,239 | Dorough | Sept. 4, 1945 |
| 2,417,293 | D'Alelio | Mar. 11, 1947 |
| 2,436,926 | Jacobson | Mar. 2, 1948 |